United States Patent
Minamiura

(10) Patent No.: US 8,521,350 B2
(45) Date of Patent: Aug. 27, 2013

(54) VEHICLE CONTROL DEVICE AND VEHICLE CONTROL METHOD

(75) Inventor: Keiichi Minamiura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/409,283

(22) Filed: Mar. 1, 2012

(65) Prior Publication Data

US 2012/0226402 A1  Sep. 6, 2012

(30) Foreign Application Priority Data

Mar. 2, 2011  (JP) .................................. 2011-45080

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/00* | (2006.01) |
| *B60W 10/08* | (2006.01) |
| *B60W 10/06* | (2006.01) |
| *B60K 6/445* | (2007.10) |

(52) U.S. Cl.
CPC ............... *B60W 20/00* (2013.01); *B60W 10/08* (2013.01); *B60W 10/06* (2013.01); *Y02T 10/6286* (2013.01); *B60K 6/445* (2013.01)
USPC ................... 701/22; 303/152; 303/3; 303/20; 303/191; 303/124; 318/371; 318/375; 318/376; 318/281; 318/261; 307/9.1; 307/10.1; 307/10.7

(58) Field of Classification Search
CPC ..... B60W 20/00; B60W 10/08; B60W 10/06; B60K 6/445; Y02T 10/6286
USPC .................. 303/3, 7, 15, 20, 113.4, 191, 151, 303/152, 124; 701/22; 318/139, 261, 281, 318/376, 369, 375, 371; 320/132, 134, 135, 320/136; 307/9.1, 10.1, 10.7
See application file for complete search history.

(56) References Cited

U.S. PATENT DOCUMENTS 5,322,352 A  *  6/1994  Ohno et al. ....................... 303/3
5,472,265 A  *  12/1995  Ohnuma ........................... 303/3
(Continued)

FOREIGN PATENT DOCUMENTS

JP  2004-155403 A  6/2004
JP  2004-196064 A  7/2004
(Continued)

OTHER PUBLICATIONS

Advances in Battery Technology: Rechargeable Magnesium Batteries and Novel Negative-Electrode Materials for Lithium Ion Batteries Jürgen O. Besenhard Prof. Dr., Martin Winter Prof. Dr. Article first published online: Feb. 14, 2002.*

*Primary Examiner* — John Q Nguyen
*Assistant Examiner* — James E Stroud
(74) *Attorney, Agent, or Firm* — Gifford, Krass, Sprinkle, Anderson & Citkowski, P.C.

(57) ABSTRACT

A control device for a vehicle includes: a charge control portion that adjusts an upper limit of charging power to a battery to prevent a negative electrode potential of the battery from dropping to a lithium reference potential, based on a charge/discharge history of the battery; a braking control portion that detects a sharing ratio between hydraulic braking force by a braking device and regenerative braking force for desired braking force according to a brake pedal depression amount so that a motor generator generates a regenerative braking force within a range of the adjusted upper limit of charging power; and a setting portion that variably sets, according to the hydraulic response rate detected by the detection portion, a degree of limitation of the upper limit when restricting charging current to the battery by restricting the upper limit.

7 Claims, 7 Drawing Sheets

(56) References Cited

U.S. PATENT DOCUMENTS

| | | | |
|---|---|---|---|
| 5,644,202 A * | 7/1997 | Toriyama et al. | 318/369 |
| 6,724,165 B2 * | 4/2004 | Hughes | 318/376 |
| 6,813,553 B2 | 11/2004 | Nakamura et al. | |
| 7,136,737 B2 | 11/2006 | Ashizawa et al. | |
| 7,275,795 B2 * | 10/2007 | Nishina et al. | 303/186 |
| 7,311,163 B2 * | 12/2007 | Oliver | 180/165 |
| 7,458,650 B2 * | 12/2008 | Toyota et al. | 303/151 |
| 7,487,851 B2 * | 2/2009 | Buck et al. | 180/65.265 |
| 7,795,825 B2 * | 9/2010 | Williams | 318/156 |
| 7,950,750 B2 * | 5/2011 | Kamikado et al. | 303/191 |
| 2003/0168266 A1 * | 9/2003 | Sasaki et al. | 180/65.3 |
| 2006/0266323 A1 * | 11/2006 | Ogimura | 123/198 A |
| 2011/0127958 A1 | 6/2011 | Ishishita et al. | |

FOREIGN PATENT DOCUMENTS

| | | |
|---|---|---|
| JP | 2010-141997 A | 6/2010 |
| WO | 2010/005079 A1 | 1/2010 |

* cited by examiner

VEHICLE CONTROL DEVICE AND VEHICLE CONTROL METHOD

CROSS REFERENCE TO RELATED APPLICATIONS

This application claims priority to Japanese Patent Application No. 2011-45080 filed on Mar. 2, 2011, which is incorporated herein by reference in its entirety including the specification, drawings and abstract.

BACKGROUND OF THE INVENTION

1. Field of the Invention

The invention relates to a vehicle control device and control method, and more specifically to break cooperative control by regenerative braking force and hydraulic braking force.

2. Description of Related Art

A motor vehicle having a vehicle driving electric motor mounted thereon, such as a hybrid vehicle or an electric vehicle, performs braking force control when braked, to ensure desired braking force for the overall vehicle by cooperation between regenerative braking force provided by a vehicle driving electric motor and braking force provided by a hydraulic braking device (hereafter, also referred to as hydraulic braking force) (see, for example, Japanese Patent Application Publication No. 2004-196064 (JP-A-2004-196064), Japanese Patent Application Publication No. 2004-155403 (JP-A-2004-155403), and Japanese Patent Application Publication No. 2010-141997 (JP-A-2010-141997)). In the description below, this braking force control shall be also referred to as "cooperative brake control". Electric power generated by regenerative braking is recovered to charge an on-vehicle electric storage device, whereby the energy efficiency, that is, the fuel economy of the vehicle is improved.

JP-A-2004-196064 describes cooperative brake control of regenerative braking and friction braking in order to prevent occurrence of insufficient vehicle deceleration due to delayed response to friction braking command value when braking is switched from regenerative braking to friction braking. More specifically, it describes a technique in which when the sharing ratio is changed by reducing the sharing ratio of regenerative braking torque while increasing the sharing ratio of friction braking torque, the rate of reduction of the regenerative braking torque is suppressed according to a delay in response of the friction braking torque.

JP-A-2004-155403 describes a cooperative control device of a composite brake which calculates a braking torque due to a hydraulic control error based on a wheel cylinder hydraulic reference model and corrects the command value of regenerative braking torque in consideration of this control error.

JP-A-2010-141997 describes cooperative brake control for a motor vehicle in which a reference value of the upper limit of charging power of an electric storage device, which limits regenerative braking force, is set variably according to a change rate of the upper limit of charging power. This makes it possible to ensure a period of time required for rise of hydraulic pressure during transition from a state in which both regenerative braking and hydraulic braking are used to a state in which only hydraulic control is used.

On the other hand, the application of lithium ion secondary batteries as on-vehicle electric storage devices has been increased. The lithium ion secondary batteries have high energy density and high output voltage, and thus can be used as on-vehicle electric storage devices requiring large battery capacity and high voltage.

However, a lithium ion secondary battery has a problem that lithium metal may deposit on a surface of the negative electrode depending on a status of use, resulting in heat generation in the battery or deterioration in performance thereof. In order to solve this problem, WO 2010/005079 discloses a control technique in which deposition of lithium metal on the negative electrode of a lithium ion secondary battery is suppressed by adjusting the power that is allowed to input to the battery based on its charge and discharge history. More specifically, it describes a technique in which, based on the history of battery current, a maximum current value that will not cause deposition of the lithium metal is successively calculated, while the power that is allowed to input to the battery is adjusted so as not to exceed the maximum current value.

In a vehicle performing cooperative brake control as disclosed in JP-A-2004-196064, JP-A-2004-155403, and JP-A-2010-141997, the fuel economy is improved further as the ratio of regenerative braking force is increased during deceleration. Therefore, in a vehicle using a lithium ion secondary battery as the on-vehicle electric storage device, the sharing ratio of regenerative braking must be increased as much as possible while suppressing deposition of lithium metal.

However, as described in WO 2010/005079, the charging power to the battery must be restricted and thus the regenerative braking force must also be restricted when the charging state becomes such that the risk of deposition of lithium metal is expected. Once charging limitation like this is started, the cooperative brake control must be performed to reduce the regenerative braking force in order to suppress the deposition of lithium metal, while substituting the shortfall caused thereby with hydraulic braking force.

If the regenerative braking force is changed at a high rate, as described in JP-A-2004-196064, JP-A-2004-155403, and JP-A-2010-141997, instantaneous fluctuations may occur in the vehicle braking force due to delayed response of the hydraulic braking force. Such fluctuations in the braking force may possibly give uncomfortable feeling to a passenger in the vehicle even if the braking performance of the vehicles is not affected thereby.

SUMMARY OF THE INVENTION

The invention provides a vehicle control device and control method for use in a vehicle having a lithium ion secondary battery mounted thereon, wherein control is performed to restrict charging to the battery in order to suppress deposition of lithium metal, and cooperative brake control is performed such that no uncomfortable feeling is given to a passenger in the vehicle due to instantaneous fluctuations in the vehicle braking force possibly caused by the control to restrict charging, while ensuring recovered energy obtained by regenerative power generation.

A first aspect of the invention is related to a control device for a vehicle having: a battery formed of a lithium ion secondary battery; a braking device configured to exert braking force on a drive wheel according to hydraulic pressure supplied from a hydraulic pressure generation circuit; a motor generator configured to transmit rotation force reciprocally with the drive wheel; and a power controller that performs bidirectional power conversion between the battery and the motor generator to control output torque of the motor generator. The vehicle control device includes: a charge control portion that adjusts an upper limit of charging power to the battery so as to prevent a negative electrode potential of the battery from dropping to a lithium reference potential, based on a charge and discharge history of the battery; a braking control portion that determines a sharing ratio between hydraulic braking force by the braking device and regenerative braking force for desired braking force according to a brake pedal depression amount so that the motor generator generates the regenerative braking force within a range of the adjusted upper limit of charging power; a detection portion that detects an actual value of hydraulic response rate in the hydraulic pressure generation circuit; and a setting portion that variably sets, according to the hydraulic response rate detected by the detection portion, a degree of limitation of the upper limit of charging power when restricting charging current to the battery by restricting the upper limit of charging power.

A second aspect of the invention is related to a control method for a vehicle having: a battery formed of a lithium ion secondary battery; a braking device configured to exert braking force on a drive wheel according to hydraulic pressure supplied from a hydraulic pressure generation circuit; a motor generator configured to transmit rotation force reciprocally with the drive wheel; and a power controller that performs bidirectional power conversion between the battery and the motor generator to control output torque of the motor generator. The vehicle control method includes: adjusting an upper limit of charging power to the battery so as to prevent a negative electrode potential of the battery from dropping to a lithium reference potential, based on a charge and discharge history of the battery; determining a sharing ratio between hydraulic braking force by the braking device and regenerative braking force for desired braking force according to a brake pedal depression amount so that the motor generator generates the regenerative braking force within a range of the adjusted upper limit of charging power; variably setting, according to the detected hydraulic response rate, a degree of limitation of the upper limit of charging power when restricting charging current to the battery by restricting the upper limit of charging power.

According to the above aspects, in a vehicle having a lithium ion secondary battery mounted thereon, after performing control to restrict charging to the battery in order to suppress deposition of lithium metal, cooperative brake control can be performed such that no uncomfortable feeling is given to a vehicle user due to instantaneous fluctuations in the vehicle braking force possibly caused by the control to restrict charging, while ensuring recovered energy obtained by regenerative power generation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
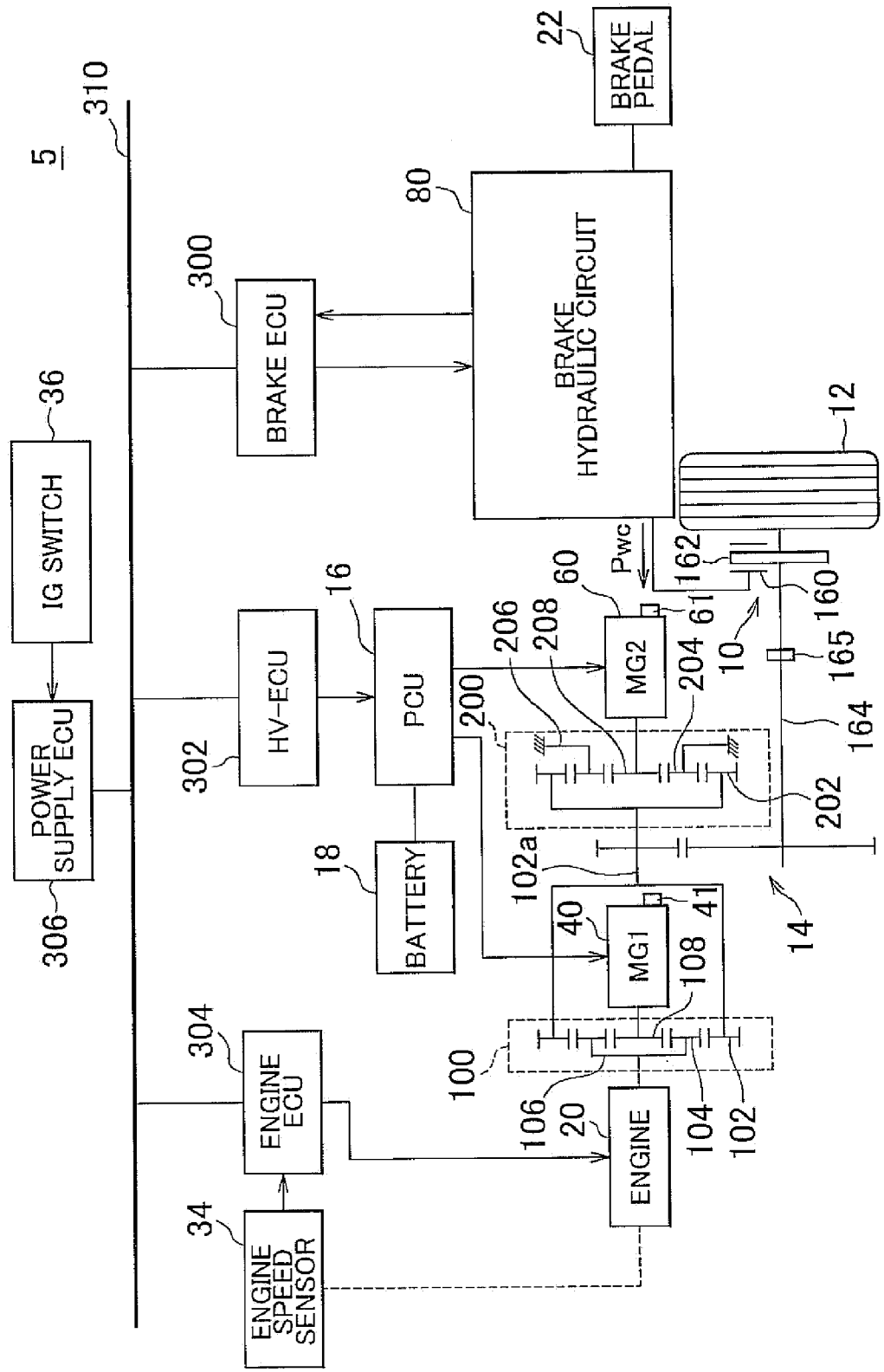
FIG. 1 is a block diagram illustrating a schematic configuration of a hybrid vehicle as a representative example of a vehicle having mounted thereon a vehicle control device according to an embodiment of the invention.

An exemplary embodiment of the invention will be described with reference to the accompanying drawings. The same or equivalent components in the drawings are assigned with the same reference numerals and description thereof will be omitted in principle.

FIG. 1 is a block diagram illustrating a schematic configuration of a hybrid vehicle as a representative example of a vehicle having mounted thereon a vehicle control device according to an embodiment of the invention.

Referring to FIG. 1, a hybrid vehicle 5 includes a braking device 10, a drive wheel 12, a reduction gear 14, an engine 20, a first motor generator (hereafter, abbreviated as first MG) 40 for power generation and starting the engine, a second motor generator (hereafter, abbreviated as second MG) 60 for driving the vehicle, a brake hydraulic circuit 80, a power dividing mechanism 100, and a transmission 200.

The hybrid vehicle 5 further includes a power control unit (PCU) 16, a battery 18 formed by a lithium ion secondary battery, a brake pedal 22, a brake electronic control unit (brake ECU) 300, a hybrid vehicle electronic control unit (HV-ECU) 302, an engine electronic control unit (engine ECU) 304, and a power-supply electronic control unit (power-supply ECU) 306. Each ECU is typically formed by a micro computer (not shown) including a central processing unit (CPU), a memory, an input/output port, and a communication port. At least some of the ECUs may be configured to perform predetermined numerical and logical data processing by means of hardware such as an electronic circuit or the like.

The brake ECU 300, the HV-ECU 302, the engine ECU 304, and the power-supply ECU 306 are communicably connected to each other via a communication bus 310.

The power-supply ECU 306 is connected to an ignition (IG) switch 36. When a driver operates the IG switch 36 to start up the system of the hybrid vehicle 5, the power-supply ECU 306 turns on an IG relay (or an IG relay and an accessory (ACC) relay) (not shown) on the condition that the brake pedal 22 is depressed. Thus, a group of electric devices composing the hybrid vehicle 5 are supplied with power, whereby the hybrid vehicle 5 is made ready to drive.

Although the description of the embodiment has been made on the assumption that the brake ECU 300, the HV-ECU 302, the engine ECU 304, and the power-supply ECU 306 are separate ECUs, some or all of these ECUs may be integrated into one ECU.

The engine 20 is an internal combustion engine, such as a gasoline engine or a diesel engine, which outputs power by burning a fuel. The engine 20 is designed to be able to electrically control the operating conditions such as throttle (intake amount), fuel supply amount, and ignition timing. The engine 20 is provided with an engine speed sensor 34. The engine speed sensor 34 detects a rotational speed of the engine 20 and transmits a signal indicating the detected rotational speed of the engine 20 to the engine ECU 304.

The engine ECU 304 controls the amount of fuel injection, the ignition timing, and the air intake amount of the engine 20 based on signals from various sensors including the engine speed sensor 34, so that the engine 20 operates at a target speed and target torque determined by the HV-ECU 302.

The battery 18 is formed by a lithium ion secondary battery. A lithium ion secondary battery has high energy density, and exhibits higher initial circuit voltage and higher average operating voltage than other types of secondary batteries. This is a reason why a lithium ion secondary battery is used as an on-vehicle electric storage device of a vehicle requiring large battery capacity and high voltage. In addition, a lithium ion secondary battery has a coulombic efficiency of approximately 100%. This means that a lithium ion secondary battery has high charge and discharge efficiency and, therefore, is capable of providing more effective utilization of energy in comparison with other types of secondary batteries.

However, as described also in WO 2010/005079, a lithium ion secondary battery has a drawback that lithium metal may be deposited on the surface of the negative electrode depending on charging conditions. In the embodiment, therefore, a control is performed to restrict the charge to the battery 18 in order to suppress deposition of lithium metal in the lithium ion secondary battery (hereafter, also referred to as "Li deposition suppression control").

The battery 18 is provided with a battery sensor for detecting state values of the battery 18. The battery sensor is configured, for example, to detect battery current Ib, battery voltage Vb, and battery temperature Tb as the state values. The state values detected by the battery sensor are transmitted to the HV-ECU 302.

In the description below, the battery current Ib shall be represented by a positive value (Ib>0) when the battery 18 is discharged, whereas the battery current Ib shall be represented by a negative value (Ib<0) when the battery 18 is charged. The HV-ECU 302 is thus enabled to acknowledge the charge/discharge history of the battery 18 based on the values of battery current Ib successively transmitted thereto.

The first MG 40 and the second MG 60 are both a three-phase dynamo-electric machine, for example, and have a function as a motor and a function as a generator. The second MG 60 can correspond to the motor generator according to the invention.

The first MG 40 and the second MG 60 are provided with rotational position sensors 41 and 61, respectively for each detecting a rotational position (angle) of a rotor (not shown).

The first MG 40 and the second MG 60 are connected to the battery 18 via the PCU 16. The PCU 16 has an inverter and/or a converter (not shown) including a plurality of semiconductor power switching elements. The PCU 16 performs bidirectional power conversion between the first MG 40 and second MG 60 and the battery 18 according to a control instruction from the HV-ECU 302. The HV-ECU 302 controls the power conversion in the PCU 16 so that the output torque of the first MG 40 and the output torque of the second MG 60 match their respective torque command values. The PCU 16 can correspond to a power controller according to the invention. The HV-ECU 302 controlling the PCU 16 can correspond to a charge control portion according to the invention.

The power dividing mechanism 100 is a planetary gear set provided between the engine 20 and the first MG 40. The power dividing mechanism 100 divides the power input from the engine 20 into power to the first MG 40 and power to the reduction gear 14 which is coupled to the drive wheel 12 via a drive shaft 164. The drive shaft 164 is provided with a vehicle speed sensor 165. A vehicle speed V of the hybrid vehicle 5 is detected based on a rotational speed of the drive shaft 164 detected by the vehicle speed sensor 165.

The power dividing mechanism 100 includes a first ring gear 102, a first pinion gear 104, a first carrier 106, and a first sun gear 108. The first sun gear 108 is an external gear coupled to an output shaft of the first MG 40. The first ring gear 102 is an internal gear arranged concentrically with the first sun gear 108. The first ring gear 102 is coupled to the reduction gear 14 via a ring gear shaft 102a rotating together with the first ring gear 102. The first pinion gear 104 engages with the first ring gear 102 and the first sun gear 108. The first carrier 106 holds the first pinion gear 104 such that the first pinion gear 104 can rotate and revolve, and is coupled to the output shaft of the engine 20.

In other words, the first carrier 106 is an input element, the first sun gear 108 is a reaction element, and the first ring gear 102 is an output element. Driving force (torque) output to the ring gear shaft 102a is transmitted to the drive wheel 12 via the reduction gear 14 and the drive shaft 164.

When the engine 20 is in operation, a reaction torque generated by the first MG 40 is input to the first sun gear 108 while an output torque of the engine 20 is input to the first carrier 106, whereby a torque of a magnitude obtained by adding/subtracting these torques appears in the first ring gear 102 functioning as the output element. In this case, the first MG 40 functions as a generator since the rotor of the first MG 40 is rotated by that torque. When the rotational speed (output rotational speed) of the first ring gear 102 is assumed to be fixed, the rotational speed of the engine 20 can be changed continuously (not stepwise) by changing the rotational speed of the first MG 40. This means that a control for setting the engine rotational speed, for example, to a rotational speed at which the best fuel economy can be achieved is performed by the HV-ECU 302 controlling the first MG 40.

When the engine 20 is in stop while the hybrid vehicle 5 is traveling, the second MG 60 is rotating positively while the first MG 40 is rotating reversely. When the first MG 40 in this condition is caused to function as a motor and to output a torque in a positive rotational direction, this torque in the positive rotational direction can be made to act on the engine 20 connected to the first carrier 106. Accordingly, the engine 20 can be started (motored or cranked) by the first MG 40. In that case, the torque acts on the reduction gear 14 in a direction to stop the rotation. Therefore, the driving force for driving the vehicle can be maintained by controlling the output torque of the second MG 60 and, at the same time, the engine 20 can be started up smoothly. The hybrid system of the hybrid vehicle 5 shown in FIG. 1 is referred to as a mechanical distributing type or split type.

When the hybrid vehicle 5 is in a regenerative braking mode, the second MG 60 is driven by the drive wheel 12 via the reduction gear 14 and the transmission 200, and hence the second MG 60 is activated as a generator. Thus, the second MG 60 operates as a regenerative brake which converts braking energy to electric power. The electric power generated by the second MG 60 is stored in the battery 18 via the PCU 16. The electric power generated by the second MG 60 is determined by a product of the torque and rotational speed of the second MG 60. Therefore, the electric power generated by the regenerative braking can be adjusted by controlling the torque of the second MG 60.

The transmission 200 is a planetary gear set provided between the reduction gear 14 and the second MG 60. The transmission 200 changes the rotational speed of the second MG 60 and transmits the changed rotational speed to the reduction gear 14. An alternative configuration is possible in which the transmission 200 is omitted and the output shaft of the second MG 60 is directly connected to the reduction gear 14.

The transmission 200 includes a second ring gear 202, a second pinion gear 204, a second carrier 206, and a second sun gear 208. The second sun gear 208 is an external gear connected to the output shaft of the second MG 60. The second ring gear 202 is an internal gear arranged concentrically with the second sun gear 208. The second ring gear 202 is connected to the reduction gear 14. The second pinion gear 204 engages with the second ring gear 202 and the second sun gear 208. The second carrier 206 holds the second pinion gear 204 such that the second pinion gear 204 can rotate and revolve. The second carrier 206 is fixed to a case or the like (not shown) so as not to rotate.

The transmission 200 may be configured to use a frictional engagement element so that rotation of the components in the planetary gear is restricted or synchronized based on a control signal from the HV-ECU 302, and so that the transmission 200 thereby changes the rotational speed of the second MG 60 in one or more steps and transmits the same to the reduction gear 14.

The HV-ECU 302 performs travel control for causing the vehicle to travel in a suitable manner for the vehicle state. For example, when starting or traveling at a low speed, the hybrid vehicle 5 is driven by the output of the second MG 60 with the engine 20 being stopped. During normal traveling, the engine 20 is activated and the hybrid vehicle 5 is driven by the output from the engine 20 and the second MG 60. The fuel economy of the hybrid vehicle 5 can be particularly improved by causing the engine 20 to operate at a highly efficient operating point. Specifically, the HV-ECU 302 sets a driving force required for the entire vehicle by reflecting the depression amount of an accelerator pedal (not shown), while the HV-ECU 302 also sets operation command values (typically, rotational speed command value and/or torque command value) for the engine 20, the first MG 40, and the second MG 60 so that the aforementioned travel can be realized.

The HV-ECU 302 estimates the state of charge (SOC) of the battery 18 based on the state values (battery current Ib, battery voltage Vb, battery temperature Tb) detected by the battery sensor 19. The SOC is represented by a percentage obtained by the current charge amount by the full charge amount. Since a conventionally available method can be applied to the estimation of the SOC, description thereof will be omitted here.

The HV-ECU 302 sets an allowable input power value (hereafter, also referred to as Win) indicating a limit value of electric power to be charged to the battery 18 and an allowable output power value (hereafter, also referred to as Wout) indicating a limit value of electric power to be discharged from the battery 18, at least based on the SOC. The input/output power to/from the battery 18 (hereafter, also referred to simply as the battery power) shall also be indicated by a positive value when the battery 18 is discharged, and by a negative value when charged. Therefore, Wout assumes zero or a positive value (Wout$\geqq$0), while Win assumes zero or a negative value (Win$\leqq$0). The HV-ECU 302 sets operation command values for the first MG 40 and the second MG 60 such that the battery power is within the range of Win to Wout.

Description will be made of a brake system of the hybrid vehicle 5. The braking device 10 includes a brake caliper 160 and a circular-disk-shaped brake disk 162. The brake disk 162 is fixed such that its axis of rotation is coincident with that of the drive shaft 164. The brake caliper 160 includes a wheel cylinder (not shown in FIG. 1) and a brake pad. The wheel cylinder is activated by supplying a hydraulic pressure to the brake caliper 160 from the brake hydraulic circuit 80. Rotation of the brake disk 162 is restricted by the activated wheel cylinder pressing the brake pad against the brake disk 162. The braking device 10 thus generates hydraulic braking force according to the hydraulic pressure Pwc supplied from the brake hydraulic circuit 80. This means that braking device 10 can correspond to the "braking device" of the invention.

The brake hydraulic circuit 80 is controlled according to an operation command from the brake ECU 300 and controls the hydraulic pressure Pwc supplied to the braking device 10. This means that the brake hydraulic circuit 80 can correspond to the "hydraulic pressure generation circuit" according to the invention".

Figure 2:
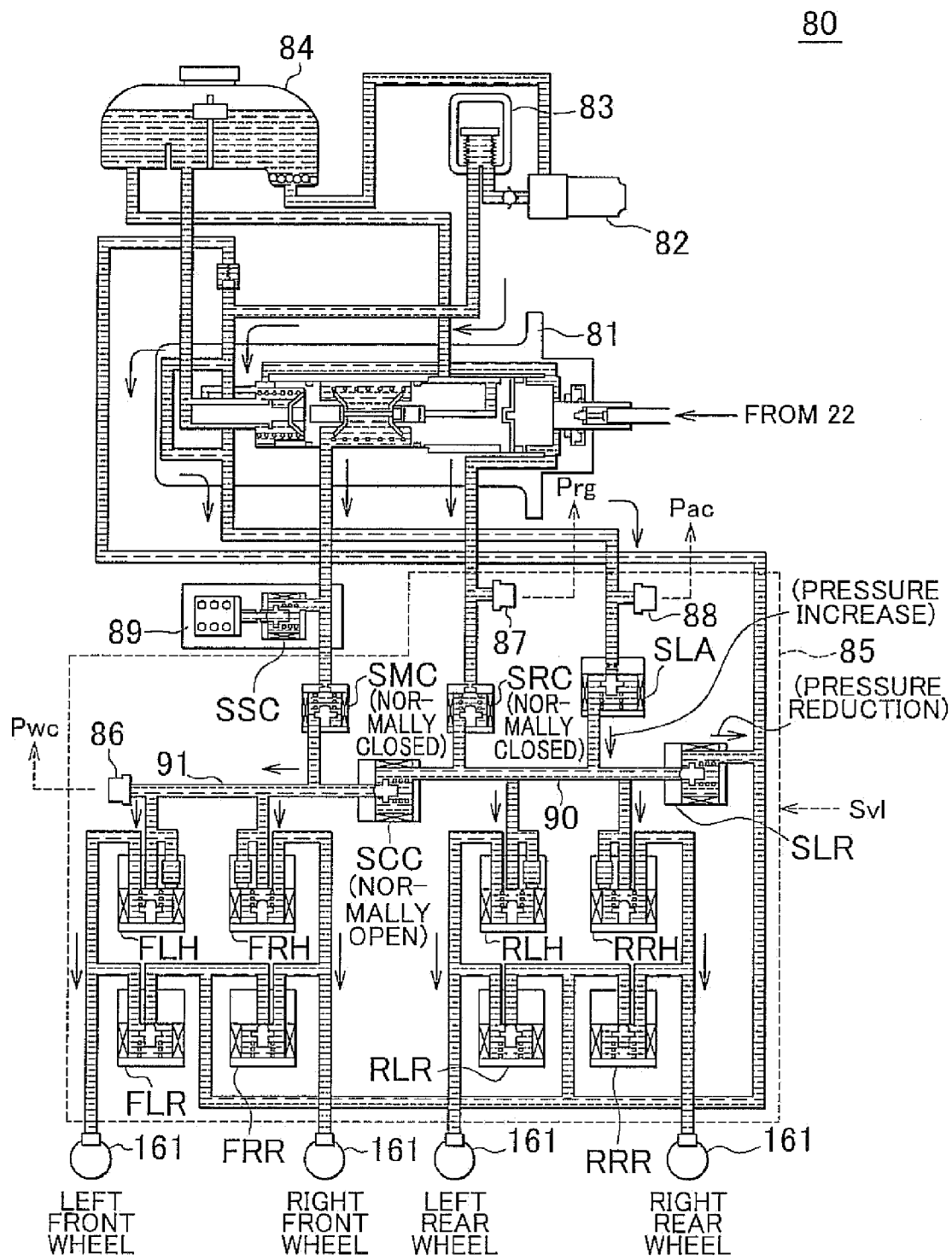
FIG. 2 is a block diagram illustrating a specific configuration example of the brake hydraulic circuit shown in FIG. 1.

FIG. 2 is a block diagram illustrating a specific configuration example of the brake hydraulic circuit 80 shown in FIG. 1.

Referring to FIG. 2, the brake hydraulic circuit 80 includes a hydraulic pressure booster 81, a pump motor 82, an accumulator 83, a reservoir 84, a brake actuator 85, and a stroke simulator 89.

The brake actuator 85 includes switching solenoid valves SSC, SMC, SRC and SCC, linear solenoid valves SLA and SLR for controlling the wheel cylinder hydraulic pressure during normal braking, control solenoid valves FLH, FLR, FRH, FRR, RLH, RLR, RRH and RRR, and hydraulic pressure sensors 86 to 88. Operation of each of the solenoid valves is controlled in response to a control signal Sv1 from the brake ECU 300.

The hydraulic booster 81 is configured to generate a hydraulic pressure (regulator pressure Prg) according to the depressing force of the brake pedal 22 in order to amplify the depressing force. The regulator pressure Prg generated by the hydraulic booster 81 can be detected by a hydraulic pressure sensor 87. The detection value by the hydraulic pressure sensor 87 is transmitted to the brake ECU 300.

The brake ECU 300 is able to detect the depression amount (depressing force) of the brake pedal 22 based on the detected regulator pressure Prg. Alternatively, the depression amount (depressing force) of the brake pedal 22 may be detected by providing a stroke sensor for directly detecting the depression amount (depressing force) of the brake pedal 22.

The stroke simulator 89 is configured such that a reaction force according to the operation of the brake pedal 22 acts on the brake pedal 22 to give the driver an optimum brake feeling.

The pump motor 82 increases the pressure of working fluid stored in the reservoir 84. The working fluid output from the pump motor 82 is supplied to the brake actuator 85 via the accumulator 83. The hydraulic supply pressure (accumulator pressure Pac) can be detected by the hydraulic pressure sensor 88. The detection value of the accumulator pressure Pac by the hydraulic pressure sensor 88 is transmitted to the brake ECU 300. The brake ECU controls the pump motor 82 such that the accumulator pressure is coincident with the command value.

The switching solenoid valve SSC opens and closes the passage to the stroke simulator 89. The switching solenoid valve SCC opens and closes the passage between a fluid passage 90 on the rear wheel side and a fluid passage 91 on the front wheel side. The switching solenoid valve SMC opens and closes the passage from the hydraulic booster 81 to the fluid passage 90. The switching solenoid valve SRC opens and closes the passage from the hydraulic pressure booster 81 to the fluid passage 91. The switching solenoid valves SMC and SRC are normally closed, whereas the switching solenoid valve SCC is normally open.

The linear solenoid valves SLA and SLR control the hydraulic pressure (wheel cylinder pressure Pwc) in the fluid passages 90 and 91 detected by the hydraulic pressure sensor 86. The detection value of the wheel cylinder pressure Pwc by the hydraulic pressure sensor 86 is transmitted to the brake ECU 300.

The brake ECU 300 controls the aperture of the linear solenoid valves SLA and SLR so that the wheel cylinder pressure Pwc matches with the target hydraulic pressure. When the wheel cylinder pressure is to be increased, the aperture of the linear solenoid valve SLA is set to be greater than zero, while the linear solenoid valve SLR is closed (aperture=0). In contrast, when the wheel cylinder pressure is to be decreased, the aperture of the linear solenoid valve SLR is set to be greater than zero, while the linear solenoid valve SLA is closed (aperture=0).

The control solenoid valves FLH, FLR, FRH, FRR, RLH, RLR, RRH and RRR are provided to independently control the hydraulic pressure supplied to the wheel cylinders 161 of the wheels when an anti-lock brake system (ABS) or traction control system is activated. The control solenoid valves include holding valves FLH, FRH, RLH and RRH for holding the hydraulic pressure supplied to their corresponding wheel cylinders 161, and pressure-reducing valves FLR, FRR, RLR and RRR for reducing the hydraulic pressure supplied to their corresponding wheel cylinders 161. When the ABS or the like is not activated, the control solenoid valves are kept closed.

During normal braking, a wheel cylinder pressure Pwc controlled by the linear solenoid valves SLA and SLR is supplied to the wheel cylinders 161. This means that the wheel cylinder pressure Pwc detected by the hydraulic pressure sensor 86 corresponds to the hydraulic pressure Pwc supplied to the braking device 10 shown in FIG. 1.

When the brake actuator 85 is in an abnormal state, the switching solenoid valves SMC and SRC are opened, whereby a hydraulic pressure (regulator pressure) according the brake depressing force from the hydraulic booster 81 is supplied to the wheel cylinders 161. The switching solenoid valve SCC can be closed in accordance with the location of the abnormality, so that the passage on the front wheel side can be separated from the passage on the rear wheel side.

Figure 3:
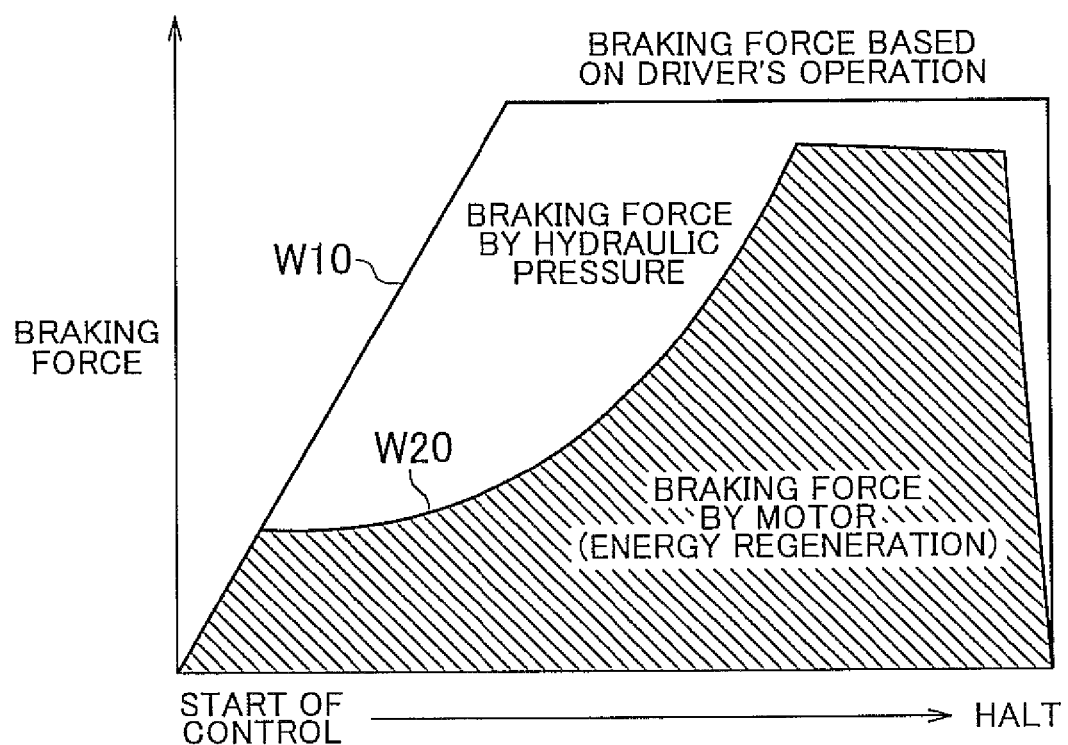
FIG. 3 is a conceptual diagram illustrating an example of cooperative brake control by regenerative braking force and hydraulic braking force.

Referring to FIG. 1 again, the hybrid vehicle 5 performs cooperative brake control so that a desired braking force (total braking force) for the entire vehicle according to the driver's operation of the brake pedal 22 is output while it is shared between regenerative braking force by the second MG 60 and hydraulic braking force by the braking device 10. FIG. 3 illustrates an example of the cooperative brake control by the hydraulic braking and the regenerative braking.

Referring to FIG. 3, the reference numeral W10 indicates a total braking force based on the driver's operation of the brake pedal. The reference numeral W20 indicates a regenerative braking force generated by the second MG 60. It can be understood that the total braking force is ensured by the sum of the regenerative braking force and the hydraulic braking force. Although not shown, in a hybrid vehicle having an engine, an engine braking force is also generated by a so-called engine brake in addition to the hydraulic braking force and the regenerative braking force. Therefore, strictly speaking, the regenerative braking force and the hydraulic braking force should be determined in consideration of the engine braking force if necessary. However, for the simplicity of description, the following description will be made on the assumption that the engine braking force=0.

The regenerative braking force, that is, the braking torque output by the second MG 60 is limited within such a range that electric power input to the battery 18 will not exceed the Win (that is, within such a range that Pb>Win). Therefore, if the Win is limited, it may cause a problem that the original regenerative braking force shown in FIG. 3 cannot be obtained. When Li deposition suppression control described also in WO 2010/005079 is applied, in particular, the Win may possibly vary in the positive direction during generation of the regenerative braking force. In this case, the regenerative braking force must be immediately reduced in order to protect the battery 18.

On this occasion, the hydraulic braking force must be increased in accordance with the reduction of the regenerative braking force. However, as described in JP-A-2004-196064, if the regenerative braking force is reduced rapidly, the increase of the hydraulic braking force (the increase of the hydraulic pressure) cannot follow the reduction of the regenerative braking force, and it may momentarily become impossible to ensure the target total braking force. If this happens, uncomfortable feeling may be given to the vehicle user even if the braking performance of the vehicle is not affected thereby.

In order to avoid such problems, the vehicle according to the embodiment of the invention sets the limitation to the regenerative electric power in the cooperative brake control as described below, in consideration of application of the Li deposition suppression control.

Figure 4:
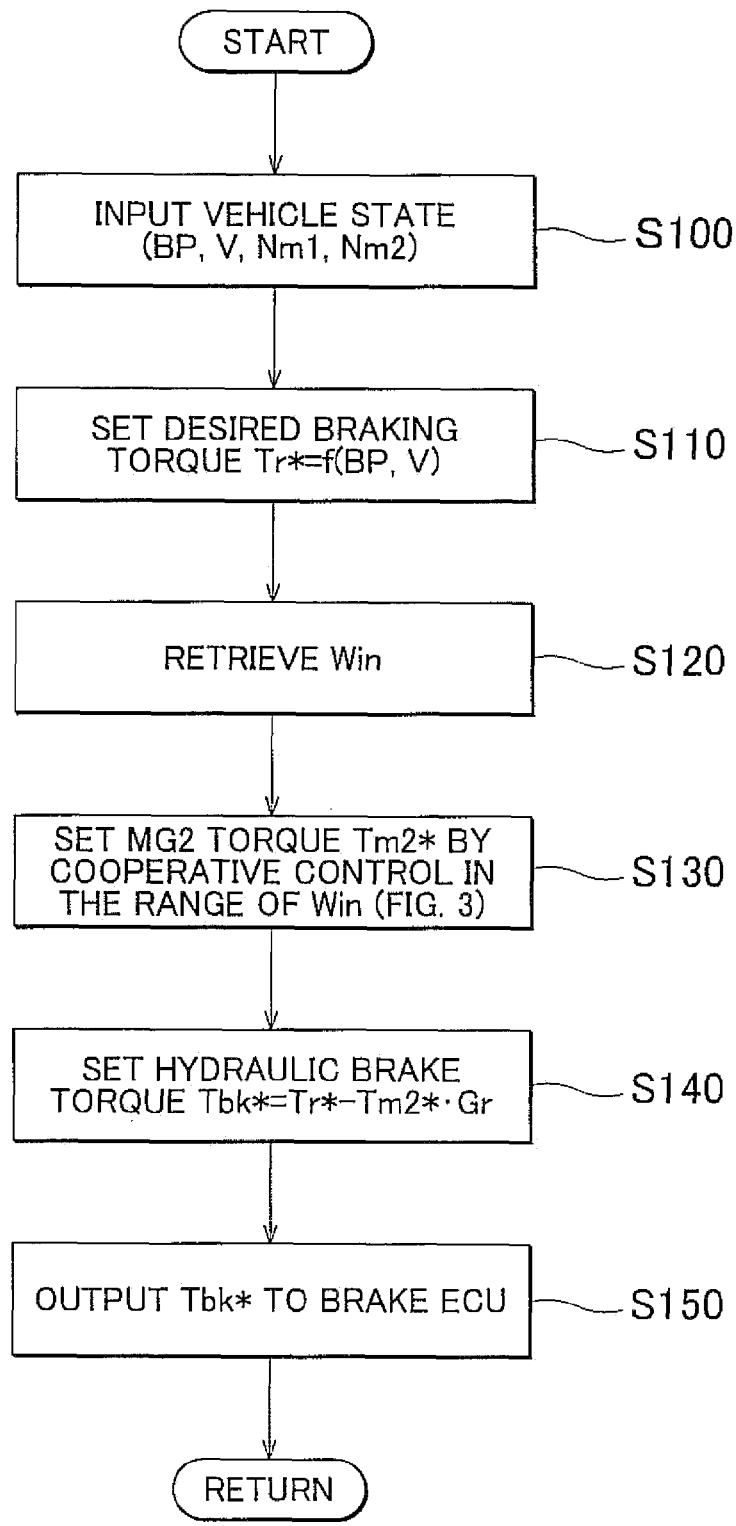
FIG. 4 is a flowchart illustrating procedures of cooperative brake control processing in the hybrid vehicle 5 shown in FIG. 1.

FIG. 4 is a flowchart illustrating control processing procedures of the cooperative brake control performed in the hybrid vehicle 5 shown in FIG. 1.

The control processing illustrated in the flowchart of FIG. 4 is performed by the HV-ECU 302 at constant control intervals. Processing steps shown in FIG. 4 are implemented by software and/or hardware processing by the HV-ECU 302.

Referring to FIG. 4, the HV-ECU 302 inputs vehicle state values of the hybrid vehicle 5 in step S100. The vehicle state values include a brake pedal depression amount BP that is a depression amount of the brake pedal 22, vehicle speed V, rotational speed Nm1 of the first MG 40, and rotational speed Nm2 of the second MG 60.

The brake pedal depression amount BP is detected for example based on a regulator pressure Prg detected by the hydraulic pressure sensor 87 shown in FIG. 2. The vehicle speed V is detected based on an output from the vehicle speed sensor 165. The rotational speeds Nm1 and Nm2 can be calculated based on outputs from the rotational position sensors 41 and 61 attached to the first MG 40 and the second MG 60, respectively.

In step S110, the HV-ECU 302 sets a required braking torque Tr* for the entire vehicle based on the vehicle state of the hybrid vehicle 5. The required braking torque Tr* corresponds to the total braking force illustrated in FIG. 3.

Typically, the required braking torque Tr* is calculated as a braking torque to be output to the ring gear shaft 102a, based on the brake pedal depression amount BP and vehicle speed V input in step S100. For example, a map may be preliminarily generated, defining a relationship between the brake pedal depression amount BP and vehicle speed V and the required braking torque Tr*, and the map may be stored in a memory (not shown) in the HV-ECU 302. In step S110, the HV-ECU 302 is enabled to set the required braking torque Tr* by referring to the map based on the brake pedal depression amount BP and the vehicle speed V input in step S100.

Subsequently, the HV-ECU 302 retrieves the Win to the battery 18 in step S120. Control processing for setting the Win will be described later in detail. |Win|(Win≦0) denotes a maximum value of magnitude of the charging power, or "the upper limit of charging power" to the battery 18 in the current control cycle. The magnitude of the battery current Ib (|Ib|) during charging (Ib<0) will be represented also as "charging current" in the description below.

In step S130, the HV-ECU 302 determines a share amount of the required braking torque Tr* that is assigned to the regenerative braking torque according to the cooperative brake control shown in FIG. 3. A torque command value of the second MG 60 generating regenerative braking force (second MG torque Tm2*) is set based on this share amount.

During regenerative braking, the second MG 60 generates electric power according to a product of torque and rotational speed. Therefore, the battery power (Pb=Vb·Ib) must not exceed the Win retrieved in step S120. Specifically, the relation of |Pb|<|Win| must be established. Accordingly, in step S130, a second MG torque Tm2* for the cooperative brake control is set while being limited within such a range that the relation of |Pb|<|Win| is established.

Further, in step S140, the HV-ECU 302 sets a hydraulic brake torque Tbk* according to the following equation (1). In the equation (1), Gr denotes a reduction ratio of the transmission 200.

$$Tbk^* = Tr^* - Tm2^* \cdot Gr \quad (1)$$

In this manner, the cooperative brake control is realized, in which the required braking torque Tr* is shared by the regenerative braking torque (Tm2*) and the hydraulic brake torque (Tbk*). The HV-ECU 302 performing the processing of steps S100 to S140 can correspond to the "braking control portion" of the invention.

Further, in step S150, the HV-ECU 302 outputs the hydraulic brake torque Tbk* set in step S140 to the brake ECU 300 (FIG. 1).

The brake ECU 300 calculates a target hydraulic pressure supplied to the braking device 10, based on the hydraulic brake torque Tbk*. The brake actuator 85 shown in FIG. 2 is then controlled so that the wheel cylinder pressure (Pwc) detected by the hydraulic pressure sensor 86 matches this target hydraulic pressure.

Description will be made of the Li deposition suppression control on the battery 18 formed by a lithium ion secondary battery.

Figure 5:
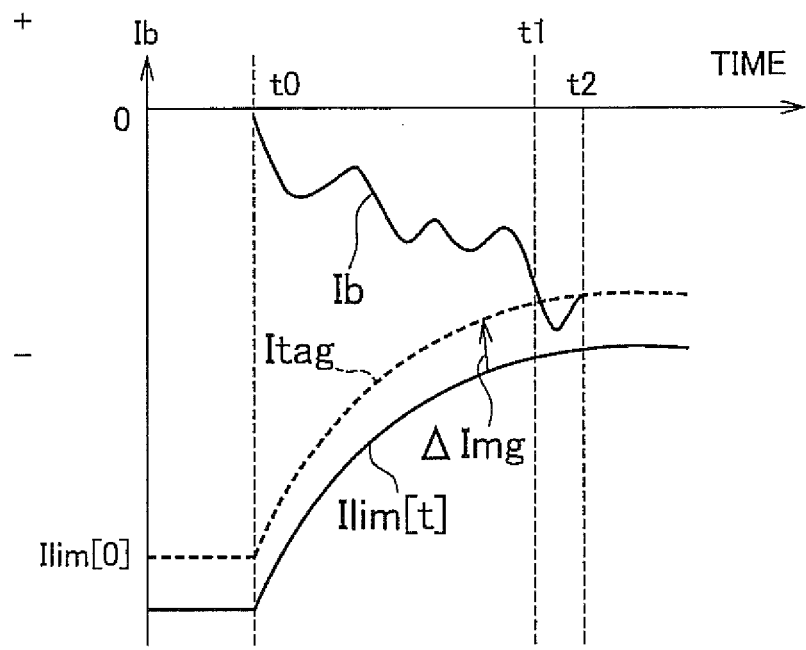
FIG. 5 is a waveform diagram illustrating Li deposition suppression control performed by the hybrid vehicle according the embodiment of the invention.
Figure 6:
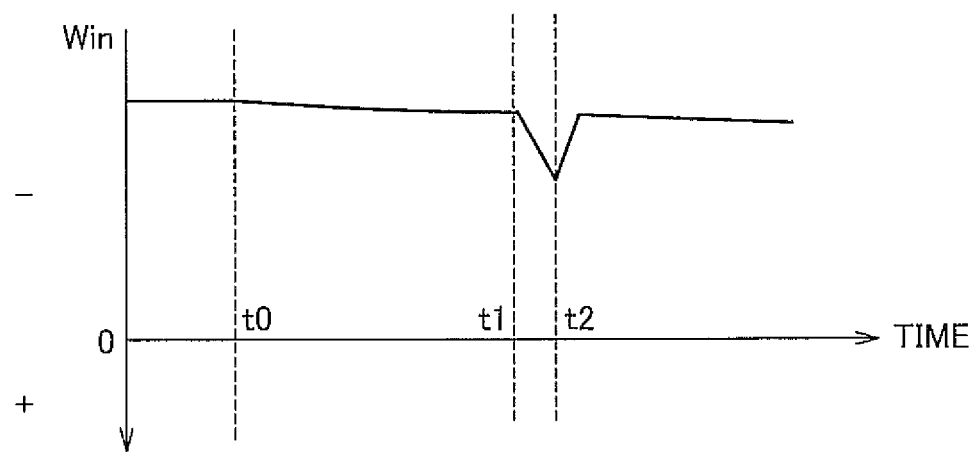
FIG. 6 is a waveform diagram illustrating regeneration limitation by Li deposition suppression control.

FIGS. 5 and 6 are waveform diagrams for explaining the Li deposition suppression control performed by the hybrid vehicle 5 according to the embodiment of the invention.

Referring to FIG. 5, the battery current Ib changes to a negative direction from time t0, and charging to the battery 18 is started.

An allowable input current value Ilim for the battery 18 is set according to the charge and discharge history of the battery 18. As described in WO 2010/005079, the allowable input current value Ilim is obtained as a maximum current value at which lithium metal will not deposit when the potential of the negative electrode of the battery drops to lithium reference potential within a unit time. The allowable input current value Ilim may be set in the same manner as in WO 2010/005079. Specifically, an allowable input current value Ilim[t] at time t is successively obtained, at each control interval, by adding or subtracting a reduction amount due to continued charging and a recovery amount due to continued discharging or a recovery amount due to the battery being left to stand, based on an initial value Ilim[0] of the allowable input current value in the state where no charge and discharge history exists.

A margin current ΔImr is set for the allowable input current value Ilim, and an input current limit target value Itag is set for preventing deposition of lithium metal. As described in WO 2010/005079, the input current limit target value Itag can be set by offsetting the allowable input current value Ilim in a positive direction. In this case, the offset current value constitutes the margin current ΔImr.

As shown in FIG. 5, the allowable input current value Ilim and the input current limit target value Itag gradually vary in a positive direction as a result of continuous charging. It will be understood that the allowable charging current (|Ib|) is decreased by this. When the battery current Ib becomes lower than the input current limit target value Itag at the time t1 (Ib<Itag), limitation of the charging current becomes necessary to suppress deposition of the lithium metal.

Therefore, as shown in FIG. 6, the charging power (i.e. regenerative electric power) is limited by changing the Win to the battery 18 in a positive direction from the time t1. For example, the Win is changed in a positive direction at a constant rate (time-change rate). This causes |Win|, namely "upper limit of charging power" to drop down. The change rate of the Win shall be hereafter referred to also as the "regeneration limitation rate". The regeneration limitation rate corresponds to an example of a degree of limitation in charging power limitation by the Li deposition suppression control (hereafter, referred to also as the "regeneration limitation").

Referring to FIG. 5 again, the charging current is reduced (that is, Ib varies in a positive direction) by limiting the Win from the time t1, and the battery current Ib becomes greater than the input current limit target value Itag again at the time t2. Thus, as shown in FIG. 6, the regeneration limitation is terminated from the time t2. As a result, the Win to the battery 18 gradually returns to its normal value.

As described above, during the regenerative braking in which large charging current is generated, regeneration limitation is started to change the Win at a constant regeneration limitation rate in order to suppress deposition of lithium metal, once the charging current reaches the input current limit target value Itag. As seen from FIGS. 5 and 6, the conditions for starting regeneration limitation become stricter as the margin current ΔImr becomes greater. On the other hand, if the margin current ΔImr is reduced, the conditions for starting regeneration limitation will be alleviated, and thus the energy recovered by regenerative power generation can be increased.

When the Win is changed by regeneration limitation during regenerative braking, the share of the regenerative braking torque (absolute value of the MG2 torque) is decreased by the processing in steps S120 and S130 of FIG. 4, while the share of the hydraulic brake torque Tbk* is increased. Accordingly, the brake ECU 300 controls the brake hydraulic circuit 80 to increase the hydraulic supply pressure Pwc to the braking device 10. As described above, the increase in the hydraulic supply pressure Pwc is somewhat delayed with respect to the increase in the command value. This causes a momentary shortage in the hydraulic brake torque, leading to momentary fluctuations of the vehicle braking force, which may give uncomfortable feeling to the user.

In order to prevent completely such uncomfortable feeling given to the user, it is conceivable to set the regeneration limitation rate to be uniformly low to ensure a sufficient margin for the control responsiveness of the hydraulic pressure. However, if the regeneration limitation rate is reduced, the limitation to the charging current started from when Ib<Itag becomes moderate. Therefore, in order to prevent deposition of lithium metal, the margin current ΔImr shown in FIG. 5 needs to be increased from the viewpoint of reliably preventing the battery current Ib from reaching the allowable input current value Ilim. This means that, when the degree of limitation of the charging power for the regeneration limitation is reduced, the conditions for starting the regeneration limitation must be made stricter. As a result, the recovered energy by the regenerative power generation is decreased by the excessive limitation of the Win.

Figure 7:
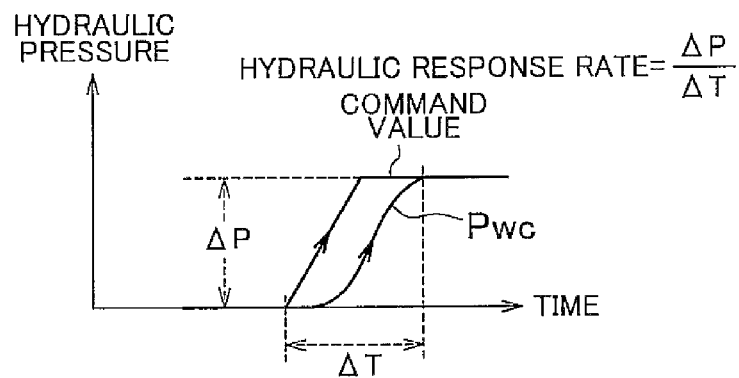
FIG. 7 is a conceptual waveform diagram illustrating delay in response of hydraulic control in the brake hydraulic circuit.

FIG. 7 is a conceptual waveform diagram for explaining delay in response of hydraulic control in the brake hydraulic circuit.

Referring to FIG. 7, when the hydraulic supply pressure to the braking device 10 is to be raised, the command value of the wheel cylinder pressure is increased. The brake ECU 300 controls the linear solenoid valve SLA shown in FIG. 2 so that the wheel cylinder pressure Pwc matches the command value. This raises the actual value of the wheel cylinder pressure Pwc (i.e. the hydraulic supply pressure to the braking device 10), following the command value.

A certain period of time (delay time) ΔT is required until the wheel cylinder pressure Pwc reaches the command value. The actual value of hydraulic response rate is obtained by dividing the hydraulic pressure variation ΔP by the delay time ΔT.

The delay time ΔT varies according to the circuit state of the brake actuator 85 or the state of the working fluid. The delay time ΔT generally tends to be greater when the temperature is low, whereas the delay time ΔT may vary depending on other factors than temperature. Therefore, it is difficult to accurately estimate the hydraulic response rate based on temperature or other indirect conditions in response to the command to raise the hydraulic pressure.

On the other hand, the brake ECU 300 is able to successively obtain an actual value of the hydraulic response rate (ΔP/ΔT) Prt based on the command value and a detection value of the hydraulic pressure sensor 86 when a control command is output to the brake actuator 85 (linear solenoid valves SLA and SLR) in accordance with variation in the command value of the wheel cylinder pressure Pwc.

Therefore, in the embodiment of the invention, as described below, the regeneration limitation rate of the Li deposition suppression control is set variably based on an actual value of the hydraulic response rate Prt in the brake hydraulic circuit 80.

Figure 8:
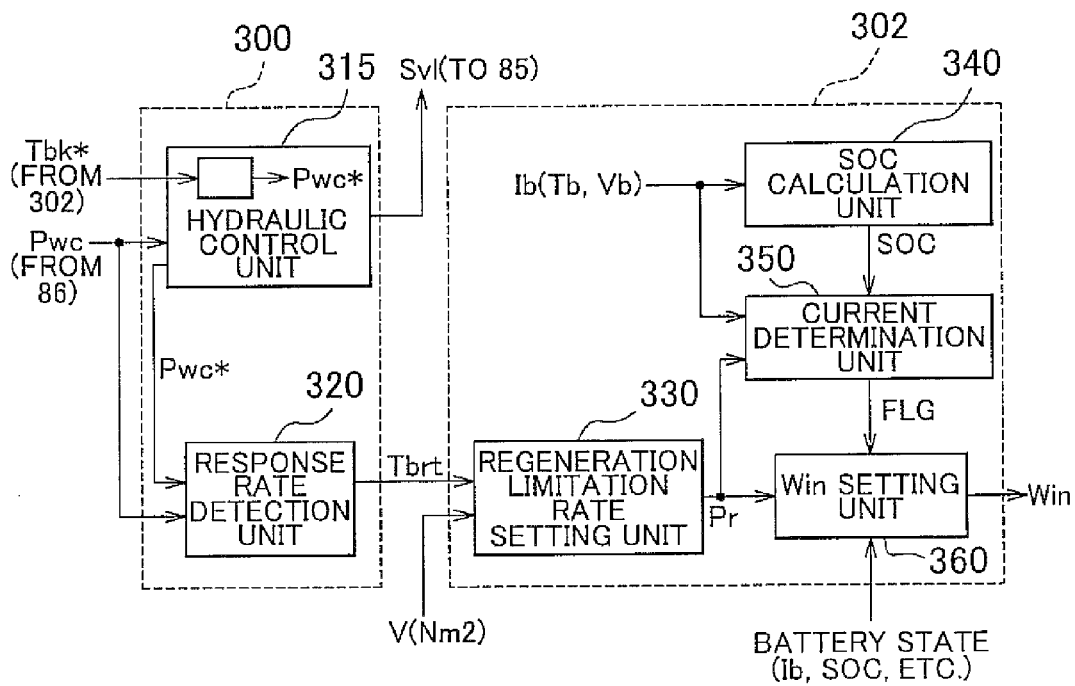
FIG. 8 is a functional block diagram illustrating cooperative brake control in combination with Li deposition suppression control in the vehicle according to the embodiment of the invention.

FIG. 8 is a functional block diagram illustrating cooperative brake control combined with Li deposition suppression control in a vehicle according to the embodiment of the invention. The functional blocks shown in FIG. 8 can be embodied by software processing and/or hardware processing by the brake ECU 300 or the HV-ECU 302.

Referring to FIG. 8, the brake ECU 300 includes a hydraulic control unit 315 and a response rate detection unit 320. The HV-ECU 302 has a regeneration limitation rate setting unit 330, a SOC calculation unit 340, a current determination unit 350, and a Win setting unit 360. The functional blocks shown in FIG. 8 are those relating to the "charge control portion" of the Li deposition suppression control among the functions of the HV-ECU 302.

The hydraulic control unit 315 generates a command value Pwc* of the wheel cylinder pressure based on a hydraulic brake torque Tbk* set by the HV-ECU 302 according to the flowchart of FIG. 4. The hydraulic control unit 315 also generates a control signal Sv1 for controlling the brake actuator 85 shown in FIG. 2 (in particular, the linear solenoid valves SLA and SLR), based on the command value Pwc* and an actual value of the wheel cylinder pressure Pwc detected by the hydraulic pressure sensor 86. The control signal Sv1 is transmitted to the brake hydraulic circuit 80.

The response rate detection unit 320 calculates a hydraulic response rate Prt described in FIG. 7 for the wheel cylinder pressure in the brake hydraulic circuit 80, based on the command value Pwc* set by the hydraulic control unit 315 and the actual value (Pwc) detected by the hydraulic pressure sensor 86. The response rate detection unit 320 can correspond to the detection portion of the invention.

The response rate detection unit 320 detects a hydraulic response rate Prt, for example, every time the command value Pwc* is varied to exceed a certain amount. The detected hydraulic response rate Prt is successively transmitted to the HV-ECU 302. This makes it possible to obtain the latest hydraulic response rate Prt based on the current state of the brake hydraulic circuit 80. The hydraulic response rate Prt is updated to the latest value at the first timing of generation of the hydraulic braking force according to the cooperative brake control shown in FIG. 3, at least every time the driver operates the brake.

The SOC calculation unit 340 calculates a SOC estimated value of the battery 18 based on the state values (battery current Ib, battery voltage Vb, and battery temperature Tb) detected by the battery sensor. In the description hereafter, the SOC estimated value shall be also referred to simply as the "SOC".

The current determination unit 350 determines whether or not regeneration limitation by the Li deposition suppression control is necessary, based on the state values and SOC of the battery 18. As is described later in more detail, the history of the battery current Ib is reflected in this determination. The current determination unit 350 turns a flag FLG on when the regeneration limitation by the Li deposition suppression control is necessary, and turns the flag FLG off when not necessary. A determination value of the flag FLG is transmitted to the Win setting unit 360.

The regeneration limitation rate setting unit 330 sets a regeneration limitation rate Pr based on the hydraulic response rate Prt (Pa/sec) calculated by the response rate detection unit 320 and the rotational speed Nm2 of the second MG 60. The regeneration limitation rate setting unit 330 can correspond to a "setting portion" of the invention. The regeneration limitation rate Pr is calculated based on the rotational speed Nm2 and a hydraulic braking force change rate Tbrt according to the following equation (2).

$$Pr(W/\text{sec}) = 2\pi \times Nm2(\text{rpm}) \times Tbrt(\text{N·m/sec}) \qquad (2)$$

The rotational speed Nm2 (rpm) of the second MG 60 in the equation (2) can be calculated based on a vehicle speed V (km/h) detected by the vehicle speed sensor 165 according to the following equation (3). Alternatively, the rotational speed Nm2 can be calculated based on an output of the rotational position sensor 61 of the second MG 60.

$$V(\text{km/h}) = 2\pi \times Nm2(\text{rpm}) \times r(m) \times 60/Gm/1000 \qquad (3)$$

In the equation (3) above, Gm denotes an overall reduction ratio represented by a product of a reduction ratio between the ring gear shaft 102a and the drive shaft 164 and a reduction ratio by the transmission 200, and r denotes a radius of a tire.

The hydraulic braking force change rate Tbrt (N·m/sec) in the equation (2) can be calculated based on the detected hydraulic response rate Prt (Pa/sec) according to the following equation (4).

$$Tbrt(\text{N·m/sec}) = Prt(Pa/\text{sec}) \times C1 \times C2 \qquad (4)$$

In the equation (4) above, C1 is a conversion factor (N·m/Pa) for converting a wheel cylinder pressure into a hydraulic brake torque. The conversion factor C1 is a constant determined according to a cylinder area of the wheel cylinder 161, a diameter of the braking action point and a coefficient of friction of the brake disk 162, and so on. The conversion factor C2 corresponds to an inverse of the overall reduction ratio Gm in the equation (3).

The equation (4) makes it possible to calculate a change rate of the hydraulic brake torque when the wheel cylinder pressure is varied according to the detected hydraulic response rate Prt. Accordingly, it is understood that no delay occurs in the hydraulic braking force even if the regenerative braking force is reduced while the hydraulic braking force is increased according to the regeneration limitation rate Pr calculated by the equation (2). It is also possible that the processing until the calculation of the hydraulic braking force change rate Tbrt (N·m/sec) based on the equation (4) is performed by the brake ECU 300 (response rate detection unit 320), and then the hydraulic braking force change rate Tbrt is transmitted from the brake ECU 300 to the HV-ECU 302.

The Win setting unit 360 sets a Win for the battery 18, based on the current battery state (SOC, state value), the flag FLG determination value from the determination unit 350, and the regeneration limitation rate Pr set by the regeneration limitation rate setting unit 330.

Figure 9:
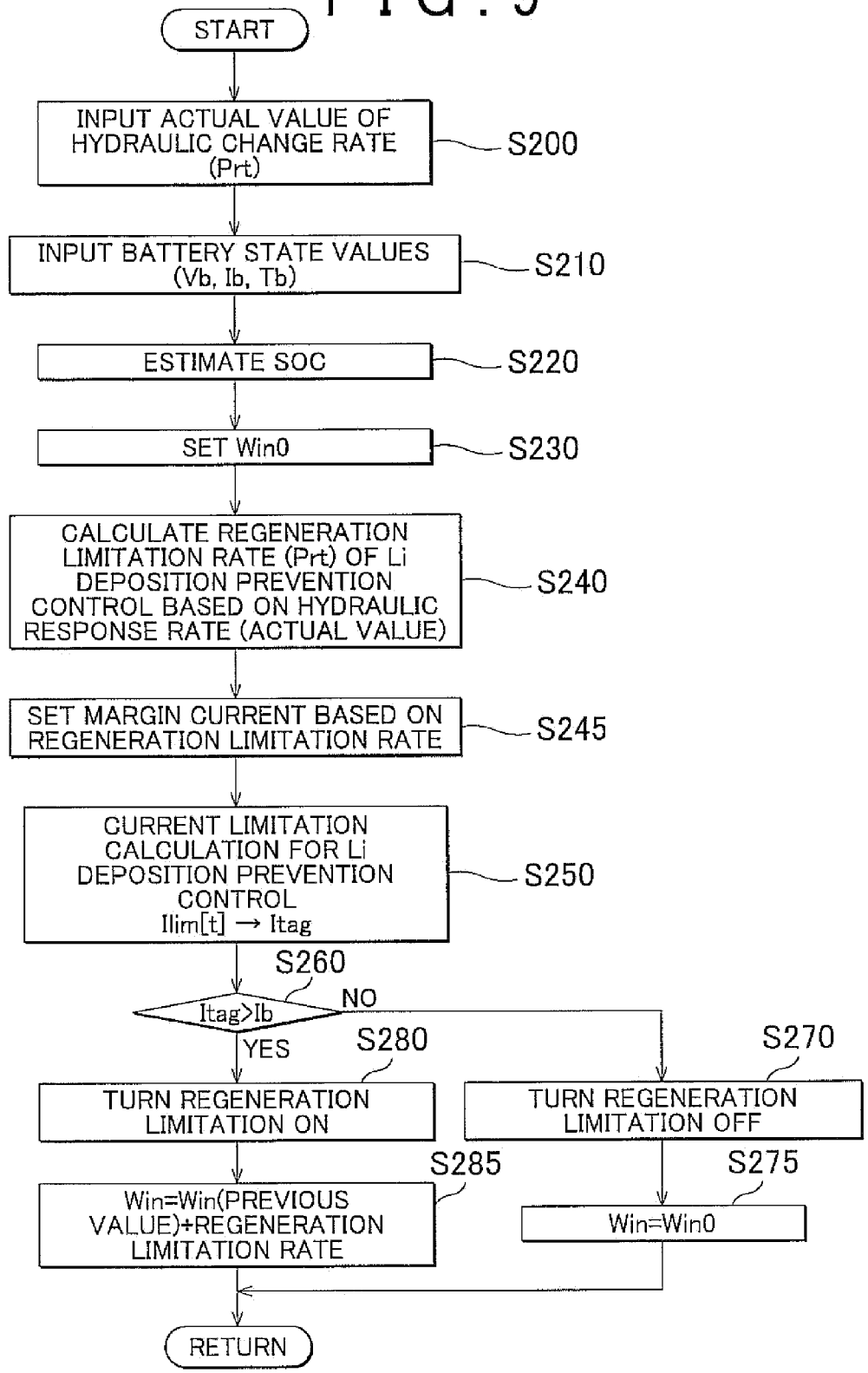
FIG. 9 is a flowchart illustrating processing to set an allowable input power value Win by Li deposition suppression control in the vehicle according to the embodiment of the invention.

FIG. 9 is a flowchart illustrating control processing for implementing the Li deposition suppression control shown in FIG. 8. The control processing according to the flowchart of FIG. 9 is performed by the HV-ECU 302 at regular control intervals. The processing steps shown in FIG. 9 can be embodied by software processing and/or hardware processing by the HV-ECU 302.

Referring to FIG. 9, in step S200, the HV-ECU 302 inputs the actual value Prt of the hydraulic response rate detected by the brake ECU 300 (response rate detection unit 320). When the processing until the calculation of the hydraulic braking force change rate Tbrt (N·m/sec) is performed by the brake ECU 300 (response rate detection unit 320), as described above, the hydraulic braking force change rate Tbrt is input to the HV-ECU 302 in step S200.

In step S210, the HV-ECU 302 inputs state values of the battery 18 based on the output from the battery sensor. As described before, the state values input in step S210 include values of voltage Vb, current Ib, and temperature Tb of the battery 18. The HV-ECU 302 calculates SOC of the battery 18 in step S220. This means that the processing in 210 corresponds to the function of the SOC calculation unit 340 shown in FIG. 8.

In step S230, the HV-ECU 302 sets Win0 for the battery 18. The Win0 means the Win before performing the regeneration limitation rate processing, and is set based on the current battery state (SOC, state values, etc.) without taking into consideration of the Li deposition suppression control. In other words, this Win0 set here corresponds to the Win to the battery 18 that is normally set according to a conventional technique. The Win0 is set based on SOC and battery temperature Tb, for example.

The HV-ECU 302 sets, in step S240, a regeneration limitation rate by the Li deposition suppression control based on the hydraulic response rate Prt (actual value). The regeneration limitation rate corresponds to the change rate in a positive direction (time-change rate) of the Win shown in FIG. 5.

The processing in step S240 corresponds to the function of the regeneration limitation rate setting unit 330 shown in FIG. 8. Therefore, in step S240, a regeneration limitation rate Pr responsive to the hydraulic response rate Prt (actual value) is calculated according to the equations (2) to (4). When the hydraulic braking force change rate Tbrt is input in step S200, the processing in step S240 is performed by the brake ECU 300.

The HV-ECU 302 sets a margin current ΔImr in step S245 according to the regeneration limitation rate Pr.

When the regeneration limitation rate is increased in order to increase the degree of limitation of the charging power, the charging current can be reduced rapidly when Ib becomes smaller than Itag. This makes it possible to alleviate the conditions for starting the regeneration limitation, and thus the margin current ΔImr can be reduced. As a result, the energy amount recovered by regenerative braking can be increased.

As described above, the margin current ΔImr in the Li deposition suppression control must be changed in an opposite sense to the regeneration limitation rate. Specifically, the margin current ΔImr must be set smaller as the regeneration limitation rate Pr during regeneration limitation becomes greater. On the contrary, the margin current ΔImr must be set greater as the regeneration limitation rate Pr during regeneration limitation becomes lower. This makes it possible to realize both prevention of deposition of lithium metal and securement of a sufficient energy amount recovered by regenerative braking.

In view of this, a map can be preliminarily generated, defining a relation between regeneration limitation rate Pr and margin current ΔImr. This map is prestored in a memory (not shown) in the HV-ECU 302. Thus, in step S245, the margin current ΔImr can be set based on the regeneration limitation rate Pr set in step S240, by referring to the map.

Further, in step S250, the HV-ECU 302 performs current control calculation for suppression control of Li deposition. Specifically, as described in FIG. 5, an allowable input current value Ilim[t] in the current control cycle is calculated based on the charge and discharge history of the battery 18 by means of the method disclosed in WO 2010/005079. The input current limit target value Itag can be calculated by providing the margin current ΔImr set in step S245 to the allowable input current value Ilim.

In step S260, the HV-ECU 302 compares the battery current Ib input in step S210 with the input current limit target value Itag calculated in step S250. The processing steps in steps S245 to S260 correspond to the functions of the current determination unit 350 shown in FIG. 8.

When Ib>Itag (determined NO in S260), the HV-ECU 302 turns off the flag FLG shown in FIG. 8 since the charging current has not reached the Itag. In this case, the HV-ECU 302 does not perform regeneration limitation in step S270. Instead, the HV-ECU 302 sets, in step S275, the Win0 set in step S230 directly as the Win to the battery 18 (Win=Win0).

In contrast, when Ib<Itag (determined YES in S260), the HV-ECU 302 turns on the flag FLG shown in FIG. 8 since the charging current has reached the Itag. In this case, the HV-ECU 302 performs regeneration limitation in step S280. This is because if the charging current is not reduced from the current state, Ib may reach the allowable input current value Ilim.

When the regeneration limitation is performed, the HV-ECU 302 sets, in step S285, the Win according to the regeneration limitation rate Pr set in step S240. More specifically, the Win is set so as to be changed in a positive direction from the Win in the previous control cycle. The upper limit of charging power (|Win|) to the battery 18 is reduced according to the regeneration limitation rate Pr, whereby the charging current to the battery 18 is reduced. As a result, the potential of the negative electrode is prevented from being reduced and thus the deposition of lithium metal can be prevented. The processing steps in steps S230 and S270 to S285 correspond to the functions of the Win setting unit 360 shown in FIG. 8.

According to the embodiment as described above, in a vehicle having a lithium ion secondary battery mounted thereon, limitation of charging power (regeneration limitation) is performed by Li deposition suppression control based on an actual value of the hydraulic response rate Prt in the brake hydraulic circuit 80, when the charging current restricted for Li deposition suppression control during regenerative power generation.

Accordingly, the limitation of charging power (regeneration limitation) by the Li deposition suppression control can be limited rapidly according to such a rate that no delay in hydraulic braking force will occur. As a result, it is made possible to prevent that uncomfortable feeling is given to the user due to instantaneous fluctuations of the braking force caused by the limitation of charging power (regeneration limitation). In addition, the conditions for stating the limitation of charging power can be alleviated (that is, the margin current ΔImr can be reduced) in such a state in which the regenerative braking force can be reduced rapidly reduced. This makes it possible to improve the energy efficiency (that is, the fuel economy) of the vehicle by ensuring maximum regenerative energy.

The vehicle to which the cooperative brake control according to the embodiment of the invention is applicable is not limited to the hybrid vehicle 5 shown in FIG. 1. The invention is commonly applicable to motor vehicles in general including hybrid vehicles, electric vehicles and fuel cell powered vehicles not having an engine, as long as they are configured to ensure the braking force by combination of regenerative braking force by the motor and hydraulic braking force according to supply of hydraulic pressure, regardless of the number of mounted motors (motor generators) or configuration of driving systems. The configuration of the hybrid vehicle is also not limited to the example shown in FIG. 1, and the invention is applicable to any type of hybrid vehicles including those of a parallel type. The invention is also applicable to vehicles having no traveling motor as long as they has a motor generating regenerative braking force.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A control device for a vehicle having:
 a battery formed of a lithium ion secondary battery;
 a braking device configured to exert braking force on a drive wheel according to hydraulic pressure supplied from a hydraulic pressure generation circuit;
 a motor generator configured to transmit rotation force reciprocally with the drive wheel; and
 a power controller that performs bidirectional power conversion between the battery and the motor generator to control output torque of the motor generator,
 the control device comprising:
 a charge control portion that adjusts an upper limit of charging power to the battery so as to prevent a negative electrode potential of the battery caused by lithium metal deposits on the negative electrode of the battery causing the battery to drop to a lithium reference potential, based on a charge and discharge history of the battery;
 a braking control portion that determines a sharing ratio between a hydraulic braking force by the braking device and a regenerative braking force for desired braking force according to a brake pedal depression amount so that the motor generator generates the regenerative braking force within a range of the adjusted upper limit of charging power;
 a detection portion that calculates an actual value of a hydraulic response rate in the hydraulic pressure generation circuit by dividing a hydraulic pressure variation amount by a delay time amount, the hydraulic pressure variation amount is a difference between a target hydraulic pressure and an actual hydraulic pressure supplied from the hydraulic pressure generation circuit to a brake caliper of the braking device, and the delay time amount is a period of time required for the actual hydraulic pressure to reach the target hydraulic pressure; and
 a setting portion that variably sets, according to the hydraulic response rate calculated by the detection portion, a degree of limitation of the upper limit of charging power when restricting charging current to the battery by restricting the upper limit of charging power.

2. The control device according to claim 1, wherein:
 when restricting the charging current to the battery, the setting portion sets a limitation rate indicating a time-change rate of reducing the upper limit of charging power to a higher value as the hydraulic response rate becomes higher; and
 the charge control portion includes:
  a) a portion that successively sets an allowable input current value as a maximum current that does not cause deposition of lithium metal on the negative electrode of the battery, based on the charge and discharge history, and the portion determines an input current limit target value for the allowable input current value so as to have a margin that is set to a smaller value as the limitation rate becomes higher; and
  b) a portion that reduces the upper limit of charging power according to the limitation rate when the charging current to the battery exceeds the input current limit target value.

3. The control device according to claim 2, wherein the setting portion includes:
 c) a portion that converts the hydraulic response rate detected by the detection portion into a change rate of braking force of the braking device; and
 d) a portion that sets the limitation rate based on a product of the converted change rate of braking force and rotational speed of the motor generator.

4. The control device according to claim 1, wherein a condition for starting limitation of the upper limit of charging power is alleviated further as the degree of limitation becomes higher.

5. A control method for a vehicle having:
 a battery formed of a lithium ion secondary battery;
 a braking device configured to exert braking force on a drive wheel according to hydraulic pressure supplied from a hydraulic pressure generation circuit;
 a motor generator configured to transmit rotation force reciprocally with the drive wheel; and
 a power controller that performs bidirectional power conversion between the battery and the motor generator to control output torque of the motor generator,
 the control method comprising:
 adjusting an upper limit of charging power to the battery so as to prevent a negative electrode potential of the battery caused by lithium metal deposits on the negative electrode of the battery causing the battery to drop to a lithium reference potential, based on a charge and discharge history of the battery;

determining a sharing ratio between a hydraulic braking force by the braking device and a regenerative braking force for desired braking force according to a brake pedal depression amount so that the motor generator generates the regenerative braking force within a range of the adjusted upper limit of charging power;

calculating an actual value of a hydraulic response rate in the hydraulic pressure generation circuit by dividing a hydraulic pressure variation amount by a delay time amount, the hydraulic pressure variation amount is a difference between a target hydraulic pressure and an actual hydraulic pressure supplied from the hydraulic pressure generation circuit to a brake caliper, and the delay time amount is a period of time required for the actual hydraulic pressure to reach the target hydraulic pressure; and variably setting, according to the detected hydraulic response rate, a degree of limitation of the upper limit of charging power when restricting charging current to the battery by restricting the upper limit of charging power.

6. The control device according to claim 1, wherein the braking device exerts the braking force on the drive wheel according to the hydraulic pressure supplied from the hydraulic pressure generation circuit to a brake caliper.

7. The control method according to claim 5, wherein the braking device exerts the braking force on the drive wheel according to the hydraulic pressure supplied from the hydraulic pressure generation circuit to a brake caliper.

* * * * *